US012576839B2

(12) United States Patent
Zhang et al.

(10) Patent No.: US 12,576,839 B2
(45) Date of Patent: Mar. 17, 2026

(54) METHOD AND SYSTEM OF ROAD DRIVING OPTIMIZATION WITH DECOUPLING OF VEHICLE STATUS AND TRAFFIC FACTORS

(71) Applicant: GM Global Technology Operations LLC, Detroit, MI (US)

(72) Inventors: Yuan Zhang, Pudong (CN); Lujia Xu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 138 days.

(21) Appl. No.: 18/439,052

(22) Filed: Feb. 12, 2024

(65) Prior Publication Data

US 2025/0242807 A1     Jul. 31, 2025

(30) Foreign Application Priority Data

Jan. 30, 2024     (CN) ......................... 202410132274.X

(51) Int. Cl.
B60W 30/14          (2006.01)
G06N 3/045          (2023.01)

(52) U.S. Cl.
CPC ........... B60W 30/143 (2013.01); G06N 3/045 (2023.01); B60W 2520/10 (2013.01); B60W 2554/802 (2020.02); B60W 2554/804 (2020.02); B60W 2555/60 (2020.02)

(58) Field of Classification Search
None
See application file for complete search history.

(56) References Cited

U.S. PATENT DOCUMENTS

| 10,933,876 | B2 * | 3/2021 | Naserian | .......... | G08G 1/096783 |
| 11,097,739 | B2 * | 8/2021 | Capua | ................ | B60W 40/107 |
| 11,370,427 | B2 * | 6/2022 | Choi | ..................... | B60W 50/14 |
| 11,667,304 | B2 * | 6/2023 | Chen | ................... | G06V 20/588 |
| | | | | | 701/36 |
| 11,814,046 | B2 * | 11/2023 | Seccamonte | ........ | B60W 50/082 |

(Continued)

FOREIGN PATENT DOCUMENTS

| DE | 102011081609 A1 | 2/2013 |
| DE | 102015108270 A1 | 12/2015 |

(Continued)

*Primary Examiner* — Rachid Bendidi
*Assistant Examiner* — Nada Mahyoob Alqaderi
(74) *Attorney, Agent, or Firm* — Vivacqua Crane, PLLC

(57) ABSTRACT

A method and system of road driving optimization, having vehicle sensors configured to collect external sensor data, vehicle-state data, and communications data; a control module configured to analyze the collected data to detect a trigger event, a status of a target vehicle, an achievable speed range, and instant traction force; a decoupling estimator module configured to analyze the trigger event, the status of the target vehicle, the achievable speed range, and a personalized driver profile to determine a maximum free flow distance and an arrival speed at the free flow distance; a machine learning model configured predict a speed profile of the host vehicle approaching the trigger event based on the determined free flow distance, the determined arrival speed at the free flow distance, and the instant traction force; and a cruise control system configured to implement the predicted speed profile.

15 Claims, 4 Drawing Sheets

(56)                    References Cited

U.S. PATENT DOCUMENTS

| | | | |
|---|---|---|---|
| 2015/0344036 A1* | 12/2015 | Kristinsson | B60W 50/0097 |
| | | | 701/22 |
| 2018/0037224 A1* | 2/2018 | Bogner | B60W 10/18 |
| 2018/0057001 A1* | 3/2018 | Hu | B60K 35/29 |
| 2019/0143981 A1* | 5/2019 | Naserian | F02N 11/0837 |
| | | | 701/55 |
| 2020/0278684 A1* | 9/2020 | Naserian | G05D 1/0221 |
| 2021/0171038 A1* | 6/2021 | Lee | B60W 30/18109 |
| 2023/0242134 A1* | 8/2023 | Skugor | B60W 50/12 |
| | | | 701/70 |
| 2023/0315107 A1* | 10/2023 | Grossman | B60W 50/14 |
| | | | 701/23 |
| 2025/0135954 A1* | 5/2025 | Saini | B60W 40/02 |

FOREIGN PATENT DOCUMENTS

| | | | | |
|---|---|---|---|---|
| DE | 102017214573 A1 * | 3/2018 | ...... | B60W 30/18072 |
| DE | 102018210650 A1 | 1/2020 | | |
| DE | 102023101951 A1 | 8/2023 | | |

* cited by examiner

METHOD AND SYSTEM OF ROAD DRIVING OPTIMIZATION WITH DECOUPLING OF VEHICLE STATUS AND TRAFFIC FACTORS

INTRODUCTION

The present disclosure generally relates to vehicles having automated driving systems, and more particularly to a method and system of road driving optimization with decoupled handling on vehicle status and traffic factors.

Modern smart vehicles have intelligent systems, also referred to as smart systems, such as Advanced Driver Assistance Systems (ADAS) and/or Automated Driving Systems (ADS) that reside onboard the smart vehicle and are used to enhance or automate functions of various vehicle systems. Smart systems have one or more control modules that are in communication with vehicle sensors such as exterior sensors, interior sensors, and state sensors, as well as with various vehicle systems such as steering, acceleration, braking, and safety systems. The control module analyzes information gathered by the vehicle sensors and generates instructions to the various vehicle systems for operating the vehicle ranging from a partial autonomous mode to a full autonomous mode.

An Adaptive Cruise Control (ACC) system may be part of the ADAS or ADS. An ACC system receive various inputs from vehicle sensors and relies on algorithms to control the longitudinal distance between a host vehicle and a target vehicle traveling immediately ahead of the host vehicle. An ACC system may also rely on algorithms to control the lateral position of the host vehicle within a lane by applying torque to a vehicle steering system in order to maintain the vehicle within the lane. Such algorithms are based on fixed rules for the ACC system of host vehicle in responding to predetermined actions of a target vehicle and other trigger events. Thus current ACC systems have limited to no abilities in optimizing the responses of the host vehicle to real world trigger events. Trigger events are traffic events that may necessitate the need of a host vehicle to adjusts its speed profile and/or a direction of travel.

While current ACC systems achieve their objectives, there is a need for a system and method to optimize vehicle performance in terms of fuel economy and passenger comfort.

SUMMARY

According to several aspects, a method of driving a host vehicle is provided. The method includes receiving, by a control module, data collected by at least one vehicle sensor; analyzing the collected data, by the control module, to detect a trigger event and determine an achievable speed range; determining, by a decoupling estimator module, a free flow distance and an arrival speed at the free flow distance based on the detected trigger event and the determined achievable speed range; inputting the determined free flow distance and the determined arrival speed at the free flow distance into a pretrained machine learning (ML) model to predict a speed profile to arrive at the trigger event; and driving the host vehicle toward the trigger event based on the predicted speed profile.

In an additional aspect of the present disclosure, the method further includes analyzing the collected data to determine a status of a target vehicle, wherein the status of the target vehicle includes a location of the target vehicle relative to the host vehicle and a speed of the target vehicle; and wherein determining, by the decoupling estimator module, the free flow distance and the arrival speed at the free flow distance is further based on the determined status of the target vehicle.

In another aspect of the present disclosure, the method further includes reiterating the predicted speed profile by inputting incremental corrections of the determined free flow distance and the determined speed at the free flow distance into the pretrained ML model.

In another aspect of the present disclosure, the method further includes retrieving a personalized operator profile; and wherein determining, by the decoupling estimator module, the maximum free flow distance and the arrival speed at the maximum free flow distance is further based on the retrieved personalized operator profile.

In another aspect of the present disclosure, the method further includes determining an instant traction force of the host vehicle; and inputting the determined instant traction force together with the determined free flow distance and the determined speed at the free flow distance into the pretrained ML model to predict the speed profile to arrive at the trigger event.

In another aspect of the present disclosure, the predicted speed profile minimizes a fuel consumption and minimizes a jerk motion of the host vehicle arriving at the trigger event.

In another aspect of the present disclosure, wherein driving the host vehicle toward the trigger event based on the predicted speed profile is executed by an Adaptive Cruse Control (ACC) system.

In another aspect of the present disclosure, the determined free flow distance is greater than a predetermined free flow distance threshold.

In another aspect of the present disclosure, the pretrained machine learning (ML) model is trained on a deep neural networks.

In another aspect of the present disclosure, the trigger event is a dynamic traffic light, and wherein the collected data includes a current state of the dynamic traffic light and a time interval until a change to a next state of the dynamic traffic light.

According to several aspects, a tangible, non-transitory, machine-readable medium, comprising machine-readable instructions, that when executed by a processor, cause the processor to: receive external sensor data and vehicle-state data; analyze the external sensor data and the vehicle-state data to determine a trigger event and determine an achievable speed range; input the determined trigger event and the determined achievable speed range into a decoupling estimator to determine a free flow distance and to determine an arrival speed at the free flow distance; input the determined free flow distance and the determined arrival speed at the free flow distance into a machine learning model to predict a speed profile to arrive at the trigger event; and drive a host vehicle toward the trigger event in accordance with the predicted speed profile.

In an additional aspect of the present disclosure, wherein the tangible, non-transitory, machine-readable medium, further comprising machine-readable instructions, that when executed by the processor, causes the processor to: receive a personal driver profile and communications data; analyze the external sensor data, the vehicle-state data, and communication data to determine the trigger event, the achievable speed range, and a status of a target vehicle; and input the determined trigger event, the determined achievable speed range, the determined status of the target vehicle, and the personal driver profile into the decoupling estimator to determine the free flow distance and to determine the arrival speed at the free flow distance.

In another aspect of the present disclosure, the trigger event is a dynamic traffic light; and wherein the communications data includes a current state of the dynamic traffic light and a time interval until a change to a next state of the traffic light.

In another aspect of the present disclosure, the tangible, non-transitory, machine-readable medium, further comprising machine-readable instructions, that when executed by the processor, causes the processor to input the predicted speed profile back into the ML model for continual training of the ML model.

In another aspect of the present disclosure, the tangible, non-transitory, machine-readable medium, further comprising machine-readable instructions, that when executed by the processor, causes the processor to update the personalized driver profile with the predicted speed profile.

According to several aspects, a system for driving a host vehicle. The system includes a plurality of vehicle sensors configured to collect external sensor data, vehicle-state data, and communications data; a control module configured to analyze the external sensor data, vehicle-state data, and communications data to detect a trigger event, a status of a target vehicle, an achievable speed range, and instant traction force; a decoupling estimator module configured to analyze the trigger event, the status of the target vehicle, and achievable speed range to determine a free flow distance and an arrival speed at the free flow distance; a pretrained machine learning (ML) model configured predict a speed profile of the host vehicle approaching the trigger event based on the determined free flow distance and the determined arrival speed at the free flow distance; and a cruise control system configured to implement the predicted speed profile.

In an additional aspect of the present disclosure, the ML model includes one of a deep neural network, a convolutional deep neural network, a deep belief network, and a recurrent neural network.

In another aspect of the present disclosure, the system further includes a data-base configured to store a retriable and updatable personalized driver profile. The decoupling estimator module is further configured to analyze the personalized driver profile to determine the free flow distance and the arrival speed at the free flow distance.

In another aspect of the present disclosure, the trigger event is a dynamic traffic light. The communications data includes a current state of the dynamic traffic light and a time interval until a change to a next state of the traffic light.

In another aspect of the present disclosure, the decoupling estimator module includes a statistical model configured to perform statistical analysis based on the trigger event, and the status of the target vehicle, the achievable speed range to determine the free flow distance and the arrival speed at the free flow distance within a predetermined confidence value threshold.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way

DETAILED DESCRIPTION

Figure 1:
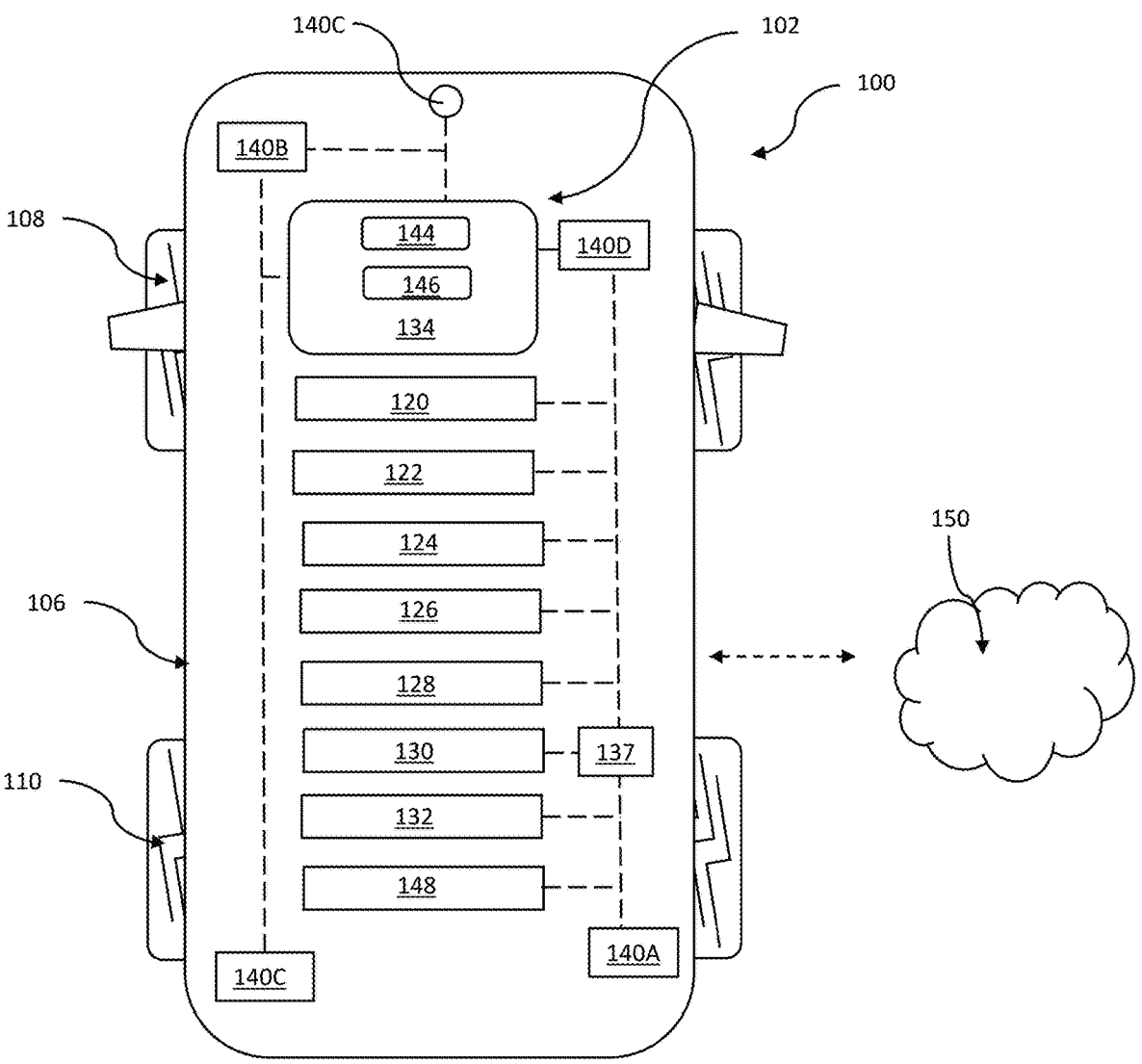
FIG. 1 is functional diagram of a host vehicle having a system for road driving optimization with decoupling of vehicle status and traffic factors, according to an exemplary embodiment.

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

As used herein, the terms module, component module, control module, or controller refer to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may conduct a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

The connecting lines shown in the various figures contained herein are intended to represent example functional relationships and/or physical couplings between the various elements. Conventional techniques may be used for signal processing, data transmission, signaling, control, and other functional aspects of the systems (and the individual operating components of the systems) may not be described in detail herein. It should be noted that many alternative or additional functional relationships or physical connections may be present in an embodiment of the present disclosure.

The following disclosure provides a system and method of road driving optimization with decoupling of vehicle status and traffic factors. Driving optimization includes improvements in fuel economy by minimizing fuel consumption and passenger comfort by minimizing jerk, which includes quick, sharp, and sudden vehicle movements in response to a trigger event. A trigger event is a traffic event that may necessitate the need of the host vehicle to adjusts its speed profile and/or a path of travel. Non-limiting examples of trigger events includes upcoming dynamic traffic signals, adjacent target vehicles, traffic situations such as a vehicle accident or road closures, and the like in the path of the host vehicle.

With a few essential parameters derived from vehicle sensor data, the impacts of surrounding traffic are concisely represented to train a machine learning model utilizing a deep learning network to develop a predictive speed profile model for use in an Adaptive Cruise Control (ACC) system of a host vehicle. In addition to the deep-learning based optimization toward short-range performance, incremental correction can be derived and applied on the optimized speed profile toward optimal performance in a longer-range perspective. The speed profile may be continuously updated and accumulated for iterative model training leading to more favorable environment representation, preference estimation, and performance prediction.

FIG. 1 is a functional diagram of a host vehicle 100 having an intelligent system such as an Active Cruise Control (ACC) system 102, which may be part of an Advance Driver Assistance System (ADAS) and/or an Automated Driving System (ADS) capable of operating from Level 0 (no driving automation) to Level 5 (full driving automation) in accordance with SAE J3016 levels of driving automation. The vehicle 100 generally includes a body 106, front wheels 108, and rear wheels 110. The body 106 substantially encloses the systems and components of the vehicle 100. The front wheels 108 and the rear wheels 110 are each rotationally coupled to the body 106 near a respective corner of the body 106. Although the connected vehicle 100 is shown as a sedan, it is envisioned that that connected vehicle 100 may be another type of on-road vehicle, such as a pickup truck, a coupe, a sport utility vehicle (SUVs), a recreational vehicle (RVs), and a motorcycle.

As shown, the vehicle 100 generally includes a propulsion system 120, a transmission system 122, a steering system 124, a brake system 126, a detection system 128, a vehicle communications system 130, and various vehicle actuators 132 for operating components of the vehicle systems 120, 122, 124, 126, 128, 130. The ACC system 102 is configured to cooperate with the vehicle systems 120, 122, 124, 126, 128, 130 and actuators 132 to control the longitudinal distance between the host vehicle 100 and a target vehicle by controlling the acceleration or deceleration of the host vehicle 100, maintaining the host vehicle 100 within a lane by controlling the lateral position of a host vehicle 100, and controlling the speed of the host vehicle 100 as it approaches a trigger event.

The host vehicle 100 includes a plurality of sensors 140A-140D configured to collect information and generate sensor data indicative of the collected information. As non-limiting examples, the plurality of sensors 140A-140D include, but not limited to, navigation sensors 140A including Global Navigation Satellite System (GNSS) transceivers or receivers; vehicle state sensors 140B including yaw rate sensors, speed sensors, and wheel torque sensors 140B; external sensors 140C including cameras, lidars, radars, and ultrasonic sensors; and internal sensors 140D including in-cabin cameras. The GNSS transceivers 140A or receivers are configured to detect the location and position of the host vehicle 100. The wheel torque sensor 140B is configured to measure the torque output, or torque, of a drive wheel 108, 110. The external sensors 140C may have a field of detection large enough to detect and identify objects in front, in the rear, and in the sides of the host vehicle 100. The internal sensors 140D may detect a state of alertness or attentiveness of a vehicle operator and/or passenger.

The vehicle communication system 130 may include one or more communication transceivers 137 configured to wirelessly communicate information, or data, to and from other remote entities, such as other connected vehicles utilizing Vehicle-to-Vehicle (V2V) communication, infrastructure units such as Road-Side Units (RSU) and Mobile Edge Computing (MEC) utilizing Vehicle-to-Infrastructure (V2I) communications, and/or cloud computing service providers 150 utilizing telecommunications. The communication transceiver 137 may be configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The ACC system 102 includes a control module 134 in communication with one or more vehicle systems 120, 122, 124, 126, 128, 130, vehicle sensors 140A-140D, and vehicle actuators 132 using a Controller Area Network (CAN) and/or ethernet. The control module 134 is configured to gather navigation data, host vehicle state data, external environment data, operator/passenger data, and/or traffic data collected by the plurality of sensors 140A-140D. Non-limiting examples of traffic data include external weather, road condition, traffic congestion, and dynamic traffic signal information from other connected vehicles, RSUs, cloud based sources, and/or other sources. The gathered data is processed to identify a trigger event and predict an optimized speed profile for the host vehicle 100 in approaching the trigger event. The predicted optimized speed profile improves fuel economy while minimizing jerk of the host vehicle 100. The control module 134 includes at least one processor 144 and a non-transitory computer readable storage device or media 146. The non-transitory computer readable storage device or media 146 includes machine-readable instructions that when executed by the processor 144, causes the processors 144 to execute the method 300 described below.

The processor 144 may be a custom made or commercially available processor, a central processing unit (CPU), a graphics processing unit (GPU), an auxiliary processor among several processors associated with the control module 134, a semiconductor-based microprocessor (in the form of a microchip or chip set), a macro processor, a combination thereof, or generally a device for executing instructions. The vehicle computer readable storage device or media 146 may include volatile and nonvolatile storage in read-only memory (ROM), random-access memory (RAM), and keep-alive memory (KAM), for example. KAM is a persistent or non-volatile memory that may be used to store various operating variables while the processor 144 is powered down. The vehicle computer-readable storage device or media 146 of the control module 134 may be implemented using a number of memory devices such as PROMs (programmable read-only memory), EPROMs (electrically programmable read-only memory), EEPROMs (electrically erasable PROM), flash memory, or another electric, magnetic, optical, or combination memory devices capable of storing data, some of which represent executable instructions, used by the control module 134 in controlling the host vehicle 100.

Figure 2:
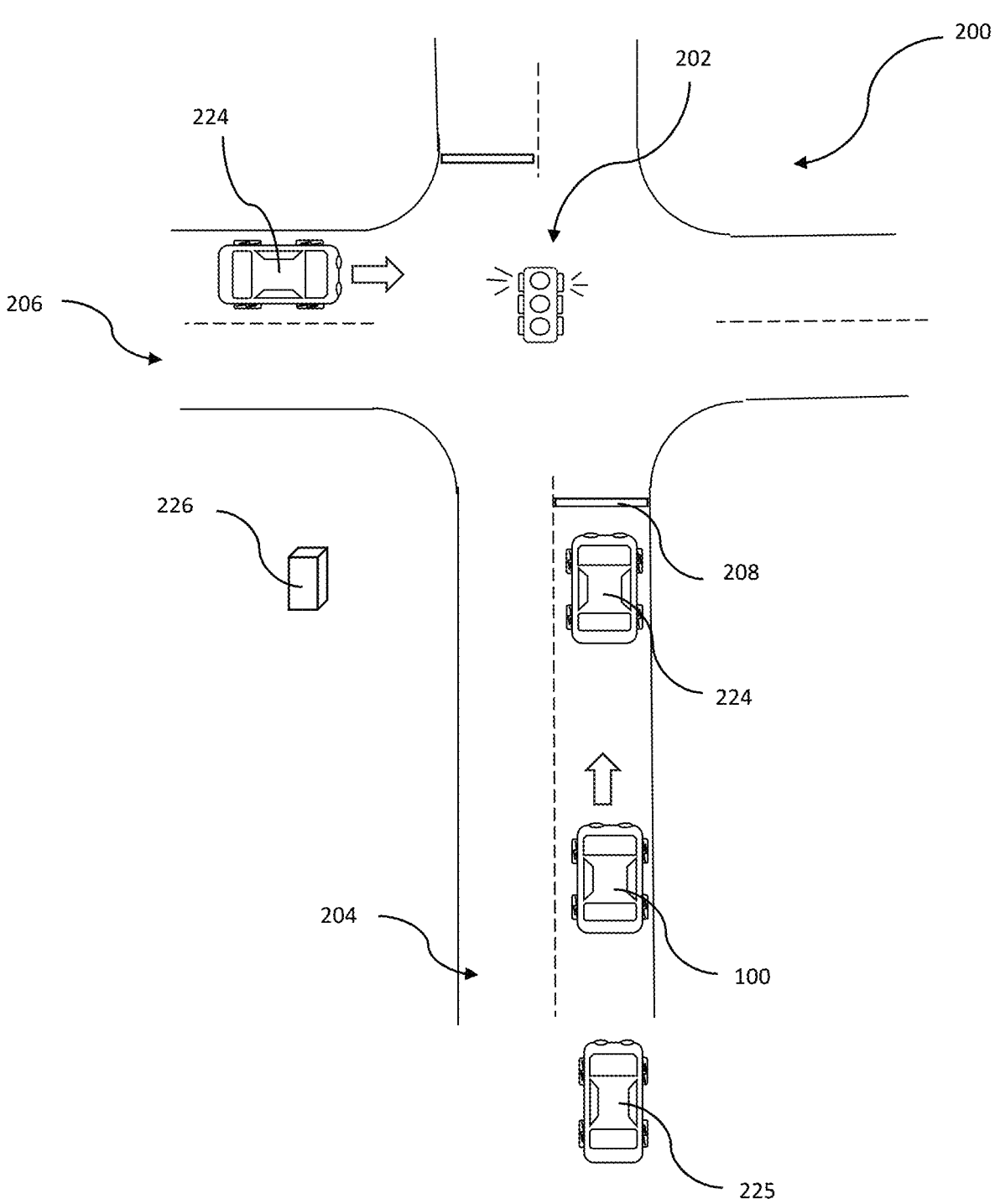
FIG. 2 is a plan view of an exemplary traffic scenario, according to an exemplary embodiment.

FIG. 2 is an illustration of a non-limiting example of a traffic scenario having multiple trigger events. FIG. 2 shows a plan view of a road intersection 200 having a dynamic traffic signal 202 configured to manage vehicle traffic flow through the road intersection 200. The road intersection 200 is defined by a first roadway 204 crossing a second roadway 206. Each of the first roadway 204 and the second roadway 206 is configured for two-way vehicle travel. The first roadway 204 includes a road marking 208, shown as a white solid line 208, located perpendicular to the first roadway 204 and prior to the intersection 200 in the direction of travel toward the intersection 200. The white solid line 208 is referred to as a stop line 208 and designates a stopping location for a vehicle responding to a stop signal or command issued by the traffic signal 202.

The dynamic traffic signal 202 is disposed at the road intersection 200 and is visible to vehicles approaching the intersection 200 on the first roadway 204 and on the second roadway 206. The traffic signal 202 is capable of sequencing between visual indicators, also referred to as phases or states, to manage the flow of vehicle traffic through the intersection 200. Common visual indicators may include words, symbols, and/or colors. In a non-limiting example, the color indicators includes a green state, a yellow state, and a red state to instruct the vehicles to continue through the intersection 200, prepare to stop before the intersection 200, or stop at the intersection 200, respectively.

At least one roadside unit (RSU) 226 is disposed proximal to the intersection 200. The RSU 226 is configured to collect data on the road conditions leading to the traffic light and transmits the data to the host vehicle 100 and/or traffic management centers. The RSU 226 may be configured to communicate with remote servers, such as servers located on the cloud or back offices, and/or with cellular infrastructure to upload or retrieve data relevant to the safe operations of the intersection. The RSU 226, remote servers, and/or cellular infrastructure may wirelessly communicate the intersection data to connected vehicles operating within a predetermined boundary surrounding the intersection 200. Such intersection data may include, but not limited to, location of the intersection, state of the traffic light, time to next state of the traffic light, information on vehicles proximal to the intersection 200, road conditions, weather conditions, sun glare, etc. The RSU 226 may be configured to communicate with connected vehicles approaching the intersection using infrastructure-to-vehicle (I2V) communications, wireless telematic services, and/or internet. While a RSU is shown as an example, a mobile edge computer (MEC) or other infrastructure unit configured to relay such data may also be utilized.

A host vehicle 100 is shown approaching the intersection on the first roadway 204. A first target vehicle 224 is shown stopped at the solid line before intersection and a second target vehicle 225 is shown immediately behind the host vehicle 100. The traffic light 202 is shown in a red state (STOP command). The traffic light 202 may wirelessly communicate information to the host vehicle 100 indicating the time period until the traffic light 202 changes from a red state to a green state (GO Command). In one response, the host vehicle 100 may need to change its speed profile by slowing to a stop before reaching the solid line 208. In another scenario, the host vehicle 100 may time the traffic light 202 by adjusting its speed profile as it approaches the traffic light 202 in order to travel through the intersection 200 as the traffic light changes to the green state. It is desirable for the host vehicle 100 to execute a change in speed profile in both scenarios that would minimize fuel consumption and minimize vehicle jerk, which includes quick, sharp, and sudden vehicle movements.

The target vehicle 224 is shown in the path of the host vehicle 100 located between the traffic light and the host vehicle 100. The target vehicle 224 may be considered as a higher priority trigger event necessitating a change in profile of the host vehicle 100 before reaching the traffic light. In which case, the host vehicle 100 would execute Method 300 below to determine whether the traffic light 202 or the target vehicle 224 would be considered a primary trigger event based on the lesser of a first free distance between the host vehicle 100 and target vehicle 224, and a second free distance between the host vehicle 100 and the traffic light 202. The ACC system is configured to react to the higher priority trigger event and to monitor other potential trigger events.

Figure 3:
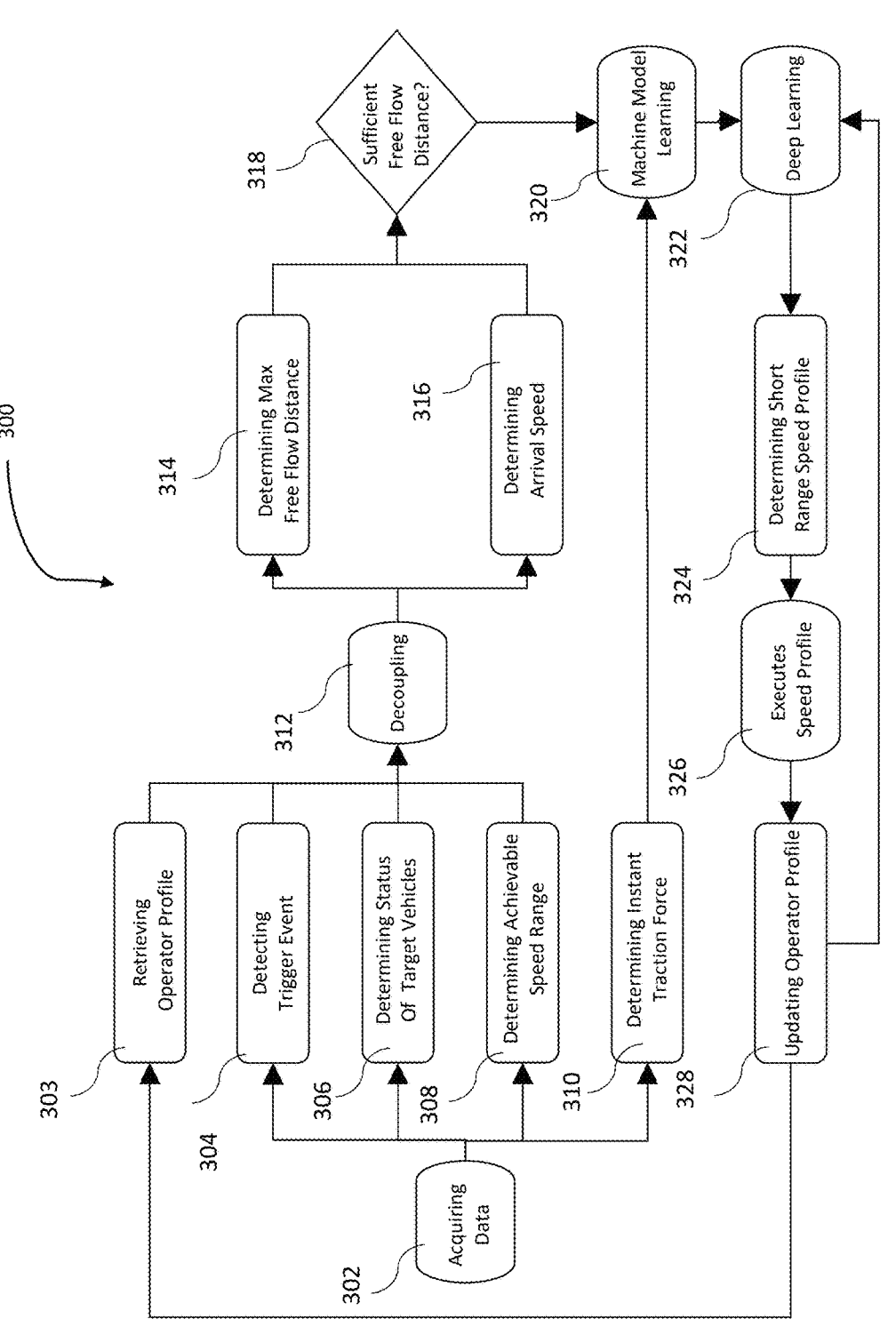
FIG. 3 is a flow block diagram of a method of road driving optimization with decoupling of vehicle status and traffic factors, according to an exemplary embodiment.

FIG. 3 is a flow block diagram of a Method 300 of road driving optimization with decoupling of vehicle status and traffic factors, according to an exemplary embodiment. The Method 300 performs an iterative host vehicle 100 speed planning for a short-range ahead, based on the estimation of maximum free-flow distance and the corresponding estimated arrival speed at such distance. The maximum free-flow distance is estimated subject to the sufficient confidence (e.g. $>=0.8$) of a constant arrival speed at such distance, based on 1 or more impacting trigger events such as traffic lights signal phases, surrounding traffic, and host vehicle's sensor capabilities. The main components of the Method 300 includes: (1) decoupling of the surrounding traffic factors into maximum free-flow distance and corresponding arrival speed; (2) rule-based selection of appropriate deep learning model(s); (3) derivation of the optimized short-range speed profile based on the selected machine learning model(s); and (4) training of machine model(s) with iteratively updated historical data.

Figure 4:
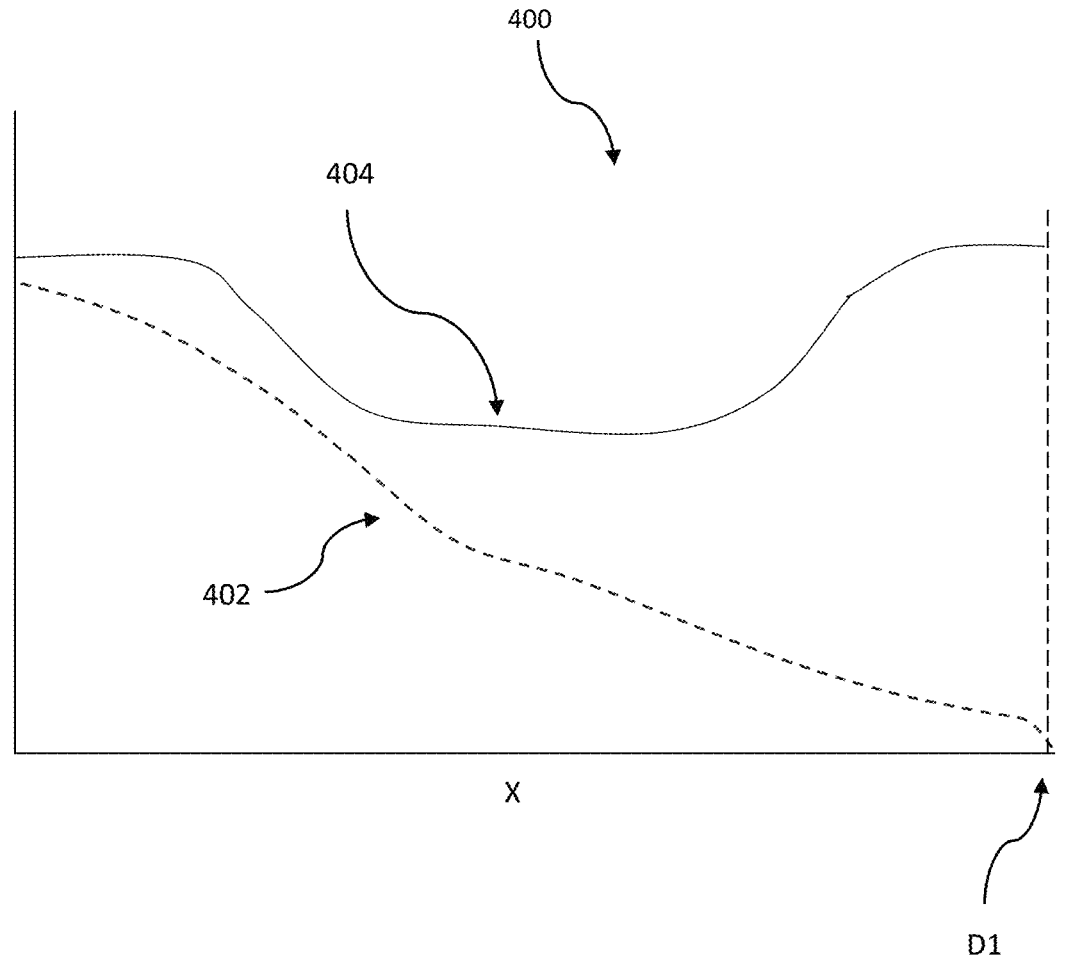
FIG. 4 is a hypothetical predicted speed profile of the host vehicle approaching a dynamic traffic signal, according to an exemplary embodiment.

FIG. 4 illustrates an example of a hypothetical speed profile 400 of a host vehicle 100 approaching a trigger event such as a dynamic traffic light. The horizontal X axis represents the distance (D1) of the host vehicle 100 to the traffic light 202. The vertical Y-axis represents the speed of the host vehicle 100. In one scenario, the dash line 402 represents the changes in speed, speed profile, of the host vehicle 100 as the host vehicle 100 comes to a stop at D1, assuming the traffic light is red (i.e. STOP) at the time of arrival of the host vehicle 100. In another scenario, the solid line 404 represents the changes in speed of the host vehicle 100 as the host vehicle 100 slows and then regains speed as the host vehicle 100 anticipates that the traffic light 202 will transitions to a green light (i.e. GO signal) once the host vehicle 100 arrives at D1.

The Method 300 begins in Block 302 with the host vehicle 100 traveling on a roadway. At Block 302, the external sensors 140C collect external sensor data on the exterior environment of the host vehicle 100, the vehicle-state sensor 140D collects host vehicle-state data including the torque output of a drive wheel and vehicle motion (e.g. direction of travel, yaw, pitch, and the like), and the communications system 130 collects communications data including on weather, road condition, and traffic conditions from infrastructure units capable of V2I communications and other vehicles capable of V2V communications. The external sensor data, host vehicle-state data, and communications data are referred to in the collective as collected data or gathered data.

At Block 304, the gathered data is analyzed by the control module 134 to detect a potential trigger event in a path of travel of the host vehicle 100. In non-limiting example, the potential trigger event is a dynamic traffic light in the path of travel of the host vehicle 100. The current state of the dynamic traffic light (e.g. red, yellow, or green state) and the timing until a change to the next state may be gathered from infrastructure units such as directly from the dynamic traffic light or from a RSU.

At Block 306, the gathered information is analyzed to determine the status of target vehicles proximal to the host vehicle 100, including the location of the target vehicles relative to the host vehicle 100, the direction of travel of each of the target vehicles, and the velocities of each of the vehicles. Targets vehicles located immediate to the front and rear of the host vehicle 100 are considered when estimating a free flow distance and an arrival speed at the free flow distance. The estimated distance and arrival speed of the host vehicle 100 are subject to the condition that the host vehicle 100 maintains a safe distance from a front target vehicle 224 and avoids sudden change in speed that would cause the rear target vehicle 225 to decelerate suddenly with sufficiently high probability.

At Block 308, the gathered information is analyzed to determine the achievable speed range based on the host vehicle's configuration, sectional speed limit of the road, road condition, weather condition, and the like.

At Block 310 the gathered information is analyzed to determine the instant traction force. The instant traction force can be determined based on the torque sensor 140B, road condition information obtained by the external sensors 140C, and host vehicle motion information gathered by the vehicle state sensors.

At Block 303, a personalized operator profile is retrieved from a database.

At Block 312, the determined trigger event, the determined status of or more target vehicles, the determined achievable speed range, and the retrieved personalized operator profile are inputted into a decoupling estimator module 148. The decoupling estimator module 148 is configured to incorporate, or attribute, the complex scenario including the determined trigger event, determined target vehicle status, and the achievable speed range, into essentially two representative variables including (i) maximum free flow distance at Block 314 and (ii) arrival speed at the free flow distance at Block 316.

The decoupling estimator module 148 includes statistical models established for the behaviors of the surrounding target vehicles, acquire the status data of the potentially impacting surrounding target vehicles, and perform statistical analysis to evaluate the pair of (i) maximum free flow distance and the (ii) arrival speed at free flow distance with a predetermined confidence value threshold. The decoupling estimator module 148 is configured to monitor the relatively definite trigger events such as the traffic light timing and lane closure ahead, so that the related constraints on the host vehicle 100 maneuvering are incorporated.

In continuation of the traffic light example, the decoupling estimator module 148 estimates the maximum distance from the current location of the host vehicle 100 to the stop line 208 at the road intersection 200 where the stop light 202 is located or to the target vehicle 224 immediately ahead of the host vehicle 100. The arrival speed could be a complete stop in response to the traffic light 202 indicating a red signal or an estimated speed through the intersection 200 in response to the traffic light 202 being in a green or yellow signal at the time of arrival of the host vehicle 100 at the intersection 200.

Proceeding to Block 318, the control module 134 determines whether the maximum free flow distance is greater than a predetermined free flow distance threshold. If the determined free flow distance is less than the predetermined free flow distance threshold, the Method 300 ends, and the host vehicle 100 maintains its current ACC system derived to maintain a safe distance from a forward target vehicle 224 or to the trigger event. If the determined maximum free flow distance is greater than the predetermined free flow distance threshold, the Method 300 proceeds to Block 320.

At Block 320, the determined (i) maximum free flow distance, (ii) arrival speed at the free flow distance, and (iii) the instant traction force are fed into a Machine Learning (ML) model for the planning of a speed profile at a short-range ahead for the host vehicle 100, subject to the feasibility constraints on speed and acceleration. The term short-range is defined as a distance in the path of travel of the host vehicle 100 with manageable level of uncertainty. Given how the ML model is trained, the optimal short-range target speed may be performed by evaluating a customized metric for a set of discrete speed values within the allowable speed range based on the ML model, and choose the speed value corresponding to the best performance. Measuring the short-range by distance is compatible with the comparison of most customized metrics. The ML model may be selected to reflect the driving behavior under a range of situations (smooth, slow-moving, and congested etc.) and the surrounding traffic situation, which is categorized into several types based on the estimated surrounding traffic parameters from Block 310 and Block 314.

Machine learning includes a training phase and an inference phase. In the training phase, as input data is fed into the machine learning model, the machine learning model adjusts its weights until it has been fitted appropriately. In the inference phase, the trained machine learning model can make inferences based on real-time data. The inference model is based on the trained machine learning model to predict speed profile as the host vehicle 100 approaches the trigger event. The training phase may be conducted on a server off-board the vehicle such as a cloud server or a server in a remote location, also referred to as a back-office. The speed profile generated by the inference model is executed by the ACC system to control the host vehicle 100 as the host vehicle 100 approaches the trigger event.

In possible conjunction with rule-based selection of the optimization approaches as well as deriving and applying the incremental correction to the optimization result in favor of longer-range performance, the optimization of the speed profile of the host vehicle 100 may involve the training of deep learning model(s) for the objective of deriving the optimal speed profile at a short-range ahead which optimizes certain performance metric (e.g. minimizes the energy consumption) during this range. The ML models are trained based on saved historical data of maximum free-flow distance, arrival speed at the distance, actual speed achieved in the short-range, instant traction force, and actual energy consumption in the short-range etc.

At Block 322, the ML model may include deep neural networks, convolutional deep neural networks, deep belief networks, and/or recurrent neural networks configured to evaluate the selected performance metric(s) of various speed values under the given situation.

At Block 324, the ML model outputs a short-range optimized speed profile through deep learning in conjunction with rule-based model selection in favor of certain local performance metrics (such as energy efficiency and maximum jerk), followed by applying the incremental correction derived in favor of optimal performance in a longer-range perspective, so that some satisfactory trade-off between complexity and performance can be achieved under traffic factor uncertainty.

Proceeding to Block 326, the short-range optimized speed profile is communicated to the ACC system. The ACC system executes the speed profile as the host vehicle 100 approaches the trigger event.

Proceeding to Block 328, a historical speed profile is updated with a recently developed speed profile. In addition to the deep-learning-based optimization toward short-range performance, incremental correction can be derived and applied on the optimized speed profile toward optimal performance in a longer-range perspective. During the process of using this solution, the driving data will be continuously updated and accumulated for iterative model training at Block 320 and Block 322 leading to more favorable environment representation, preference estimation. and performance prediction of the speed profile.

From Block 328, the developed speed profile is saved as part of the personalized driver profile in Block 303. The Method returns to Block 302 and continues to monitor the maximum free-flow distance and the corresponding arrival speed.

A trigger event can be interpreted as a bridge between human (or system) perception and algorithm approach, which helps to understand the decoupled handling part of the Method 300 more intuitively. In the case of manual driving, the driver will continuously observe the surrounding objects (traffic lights, pedestrians, other vehicles, etc.) to notice the occurrence of any trigger event. Although the driver perceives in terms of the events happening (traffic light turn red, vehicle cut-in, etc.), the actual condition that determines the need to take corresponding action is the change in surrounding traffic variables caused by the events. Therefore, the variable "free flow distance" and "arrival speed", which summarize all impacts related to the host vehicle 100 and can be applied to all types of trigger events, is designed to represent the driver's or system's response to surrounding trigger events through the input of the ML model.

The above disclosed system and method provides a cost-effective approach to derive the optimal vehicle speed profile in a forthcoming short-range, with satisfactory trade-off between complexity and performance under traffic factor uncertainty. The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A method of driving a host vehicle, comprising:
receiving, by a control module, data collected by at least one vehicle sensor;
analyzing the collected data, by the control module, to detect a plurality of trigger events and determine an achievable speed range for each of the trigger events;
determining, by a decoupling estimator module, a maximum free flow distance and an arrival speed at the maximum free flow distance based on the plurality of detected trigger events and the determined achievable speed range for each of the trigger events;
determining an instant traction force of the host vehicle;
inputting the determined maximum free flow distance, the determined arrival speed at the maximum free flow distance, and the instant traction force of the host vehicle into a pretrained machine learning (ML) model to predict a speed profile to arrive at the maximum free flow distance, wherein the predicted speed profile is configured to minimize a fuel consumption and a jerk motion of the host vehicle;
driving the host vehicle toward the maximum free flow distance based on the predicted speed profile;
updating a personalized operator profile with the predicted speed profile; and
continual training of the ML model in real-time based on the maximum free flow distance, the arrival speed at maximum free-flow distance, the instant traction force, and the updated personalized operator profile.

2. The method of claim 1, wherein the plurality of trigger events include a target vehicle, and the method further includes:
analyzing the collected data to determine a status of the target vehicle, wherein the determined status of the target vehicle includes a location of the target vehicle relative to the host vehicle and a speed of the target vehicle; and
wherein determining, by the decoupling estimator module, the maximum free flow distance and the arrival speed at the maximum free flow distance is further based on the determined status of the target vehicle.

3. The method of claim 2, further comprising reiterating the predicted speed profile by inputting incremental corrections of the determined maximum free flow distance and the determined arrival speed at the maximum free flow distance into the pretrained ML model.

4. The method of claim 1, wherein driving the host vehicle toward the maximum free flow distance based on the predicted speed profile is executed by an Adaptive Cruise Control (ACC) system.

5. The method of claim 1, wherein the determined free flow distance is greater than a predetermined free flow distance threshold.

6. The method of claim 1, wherein the pretrained machine learning (ML) model is trained on a deep neural network.

7. The method of claim 1, wherein the plurality of trigger events is include a dynamic traffic light, and wherein the collected data includes a current state of the dynamic traffic light and a time interval until a change to a next state of the dynamic traffic light.

8. A tangible, non-transitory, machine-readable medium, comprising machine-readable instructions, that when executed by a processor, cause the processor to:
receive personalized operator profile, external sensor data, and vehicle-state data;
analyze the external sensor data and the vehicle-state data to determine an instant traction force, a plurality of trigger events, and an achievable speed range for each of the plurality of trigger events;
input the plurality of determined trigger events and the determined achievable speed range for each of the plurality of trigger events into a decoupling estimator to determine a maximum free flow distance and to determine an arrival speed at the maximum free flow distance;
input the personalized operator profile, the instant traction force, the determined maximum free flow distance, and the determined arrival speed at the maximum free flow distance into a machine learning model to predict a speed profile to arrive at the maximum free flow distance, wherein the predicted speed profile is configured to minimize a fuel consumption and a jerk motion of a host vehicle; and drive the host vehicle toward the maximum free flow distance in accordance with the predicted speed profile.

9. The tangible, non-transitory, machine-readable medium of claim 8, wherein the plurality of trigger events includes a dynamic traffic light; and wherein the communications data includes a current state of the dynamic traffic light and a time interval until a change to a next state of the dynamic traffic light.

10. The tangible, non-transitory, machine-readable medium of claim 8, wherein the tangible, non-transitory, machine-readable medium, further comprising machine-readable instructions, that when executed by the processor, causes the processor to:

input the predicted speed profile into the ML model to continual training of the ML model.

11. The tangible, non-transitory, machine-readable medium of claim 8, wherein the tangible, non-transitory, machine-readable medium, further comprising machine-readable instructions, that when executed by the processor, causes the processor to:

update the personalized driver profile with the predicted speed profile.

12. A system for driving a host vehicle, comprising:

a data-base configured to store a retriable and updatable personalized driver profile;

a plurality of vehicle sensors configured to collect external sensor data, vehicle-state data, and communications data;

a control module configured to analyze the external sensor data, vehicle-state data, and communications data to detect a plurality of trigger events, an achievable speed range for each of the plurality of trigger events, and an instant traction force;

a decoupling estimator module configured to analyze the plurality of trigger events and the achievable speed range for each of the plurality of trigger events to determine a maximum free flow distance and an arrival speed at the maximum free flow distance;

a pretrained machine learning (ML) model configured predict a speed profile of the host vehicle approaching the maximum free flow distance based on the instant traction force, the maximum free flow distance, the determined arrival speed at the maximum free flow distance, and an updated personalized driver profile; and a cruise control system configured to implement the predicted speed profile; and wherein the predicted speed profile is configured to minimize a fuel consumption and a jerk motion of the host vehicle.

13. The system of claim 12, wherein the ML model includes one of a deep neural network, a convolutional deep neural network, a deep belief network, and a recurrent neural network.

14. The system of claim 12, wherein the plurality of trigger events includes a dynamic traffic light; and wherein the communications data includes a current state of the dynamic traffic light and a time interval until a change to a next state of the dynamic traffic light.

15. The system of claim 14, wherein the decoupling estimator module comprises a statistical model configured to perform statistical analysis based on the plurality of trigger events, and the achievable speed range for each of the plurality of trigger events to determine the maximum free flow distance and the arrival speed at the maximum free flow distance within a predetermined confidence value threshold.

\* \* \* \* \*